United States Patent [19]

Scott et al.

[11] Patent Number: 5,268,137

[45] Date of Patent: Dec. 7, 1993

[54] METHOD OF MAKING AN OBJECT RETENTION LINER FOR CONCRETE CONSTRUCTION

[76] Inventors: Samuel C. Scott; William C. Scott, III; Mark A. Scott, all of 4575 Joliet St., Denver, Colo. 80239

[21] Appl. No.: 920,901

[22] Filed: Jul. 28, 1992

[51] Int. Cl.$^5$ ............................................. B29C 33/40
[52] U.S. Cl. .................................... 264/225; 249/96; 249/112; 249/189; 264/257; 264/277; 264/278
[58] Field of Search .................... 249/15, 16, 96, 112, 249/189; 264/35, 219, 225, 261, 264, 257, 277, 278

[56] References Cited

U.S. PATENT DOCUMENTS

| | | | |
|---|---|---|---|
| 1,809,504 | 6/1931 | Carvel | 264/35 |
| 2,178,535 | 10/1939 | Willson | 249/15 |
| 2,465,871 | 3/1949 | Hardie et al. | 249/15 |
| 2,964,800 | 12/1960 | Dorsett | 249/16 |
| 3,231,646 | 1/1966 | Conder et al. | 249/96 |
| 3,312,761 | 4/1967 | Vida | 264/219 |
| 3,349,158 | 10/1967 | Maynard | 264/261 |
| 3,359,354 | 12/1967 | Johnson | 264/35 |
| 3,602,476 | 8/1971 | Iragorri | 249/96 |
| 3,629,384 | 12/1971 | Elgenstierna | 264/264 |
| 3,694,533 | 9/1972 | Kelsey | 264/277 |
| 3,759,481 | 9/1973 | Scott | 249/189 |
| 4,026,083 | 5/1977 | Hoyt et al. | 52/387 |
| 4,031,682 | 6/1977 | Renkert | 52/434 |
| 4,146,599 | 3/1979 | Lanzetta | 249/15 |
| 4,239,824 | 12/1980 | Kasten | 428/13 |
| 4,654,108 | 3/1987 | Kurata et al. | 156/561 |
| 4,662,140 | 5/1987 | Porter et al. | 52/385 |
| 4,773,201 | 9/1988 | Trezza | 52/510 |
| 4,809,470 | 3/1989 | Bauer et al. | 52/97 |
| 4,858,410 | 8/1989 | Goldman | 52/592 |
| 5,009,387 | 4/1991 | Scott et al. | 249/96 |

FOREIGN PATENT DOCUMENTS 2-78502 3/1990 Japan .................................. 264/257
491397 9/1938 United Kingdom ................ 264/277

OTHER PUBLICATIONS

Article (No Date) entitled "Ceramic Tile Installation Methods Practiced in Japan".

*Primary Examiner*—Jay H. Woo
*Assistant Examiner*—Robert B. Davis
*Attorney, Agent, or Firm*—James E. Pittenger

[57] ABSTRACT

An object retention form liner is described for use in holding and transferring objects, such as thin bricks to the finished surface of concrete structures. The form liner is produced by strategically positioning a plurality of bricks in a face-up position in a flat, shallow mold. Recesses sized to fit the bricks can be provided in the surface of the mold with a sealing ridge provided between each of the recesses. The bricks are positioned in the recesses and a liquid elastomeric material is poured into the mold to cover the bricks. Reinforcing fiberglass mesh can be embedded in the elastomeric material to provide additional tensile strength to the liner. Upon setting, the liner and retained bricks are removed from the mold and the liner can be stored, shipped or used in concrete construction. The liners are attached to the inside surface of concrete forms and the bricks are held rigidly in place while the concrete is poured and sets. Upon removal of the form and liner, the bricks remain permanently embedded in the surface of the concrete structure providing an improved aesthetic appearance. Through the gasketing effect that is obtained by embedding the outer surface of the bricks in the elastomeric material, the necessity for cleaning or repairing the surface in the finished wall is eliminated.

8 Claims, 3 Drawing Sheets

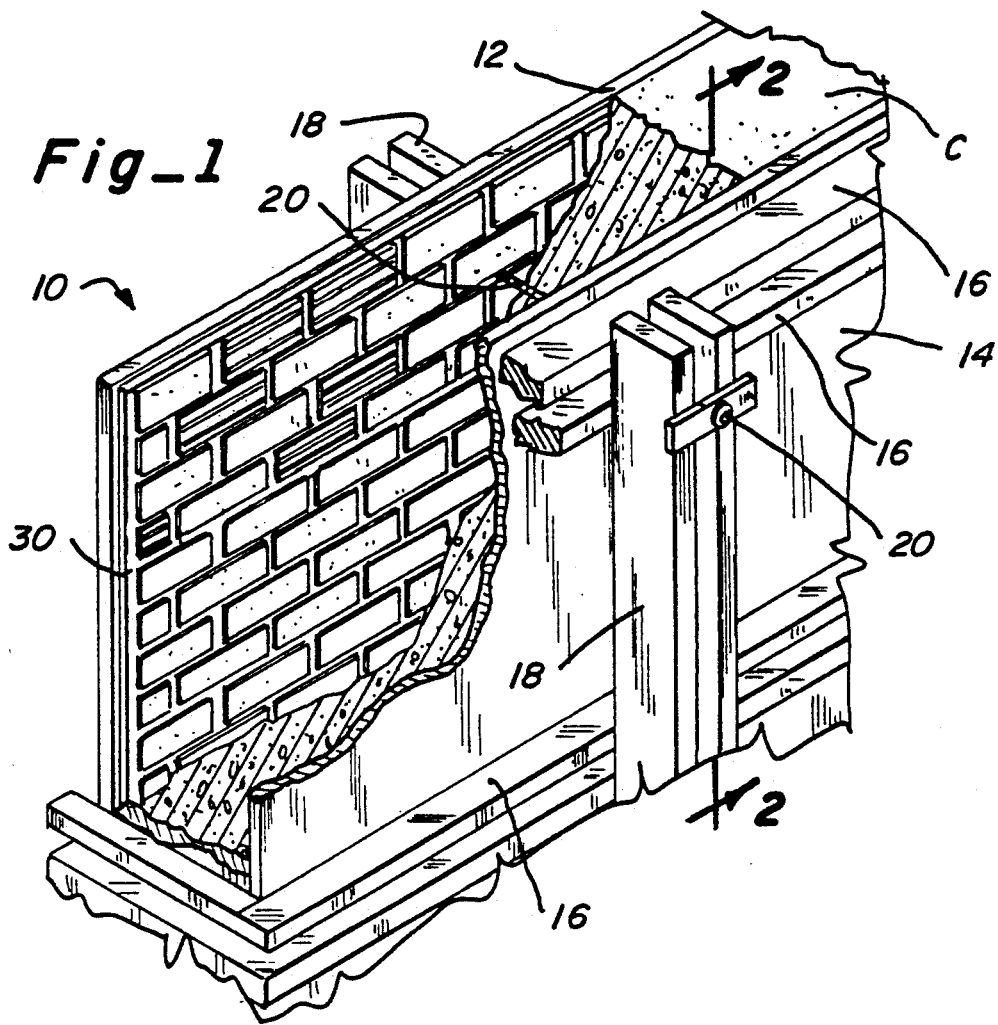
Fig_1
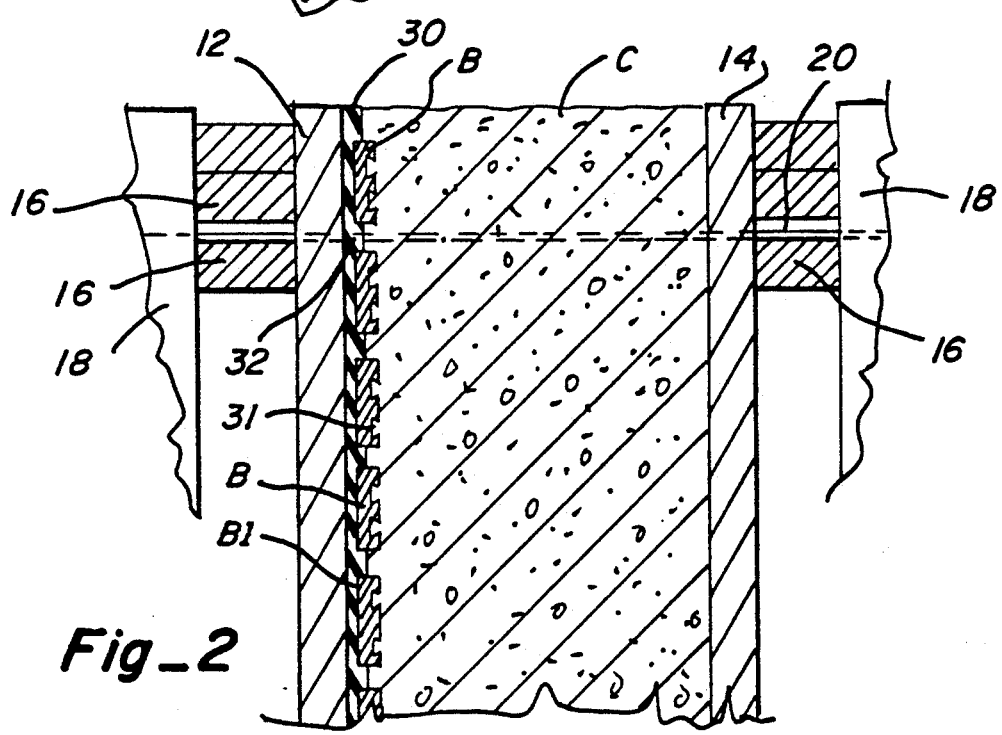
Fig_2

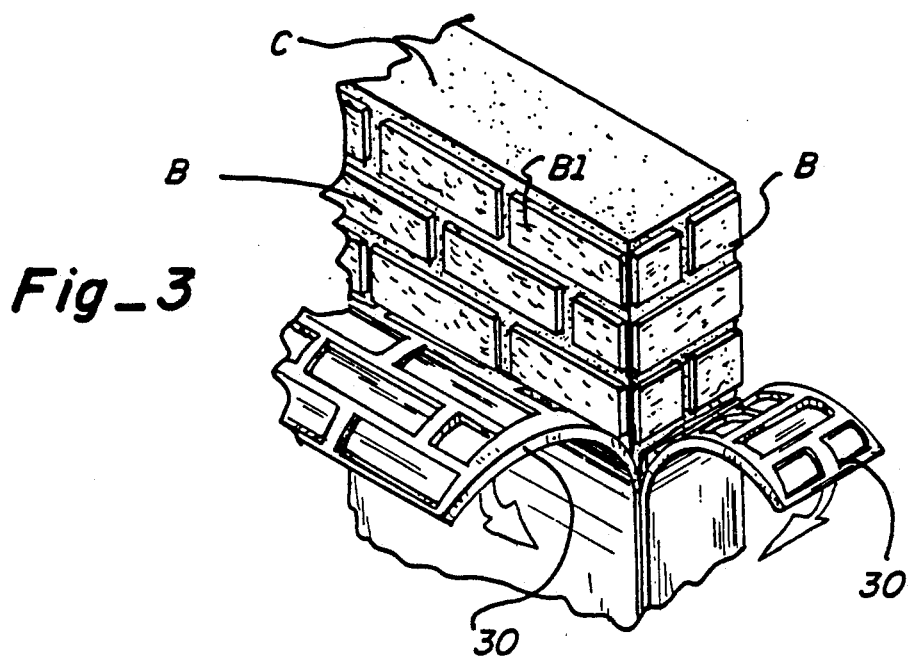
Fig_3
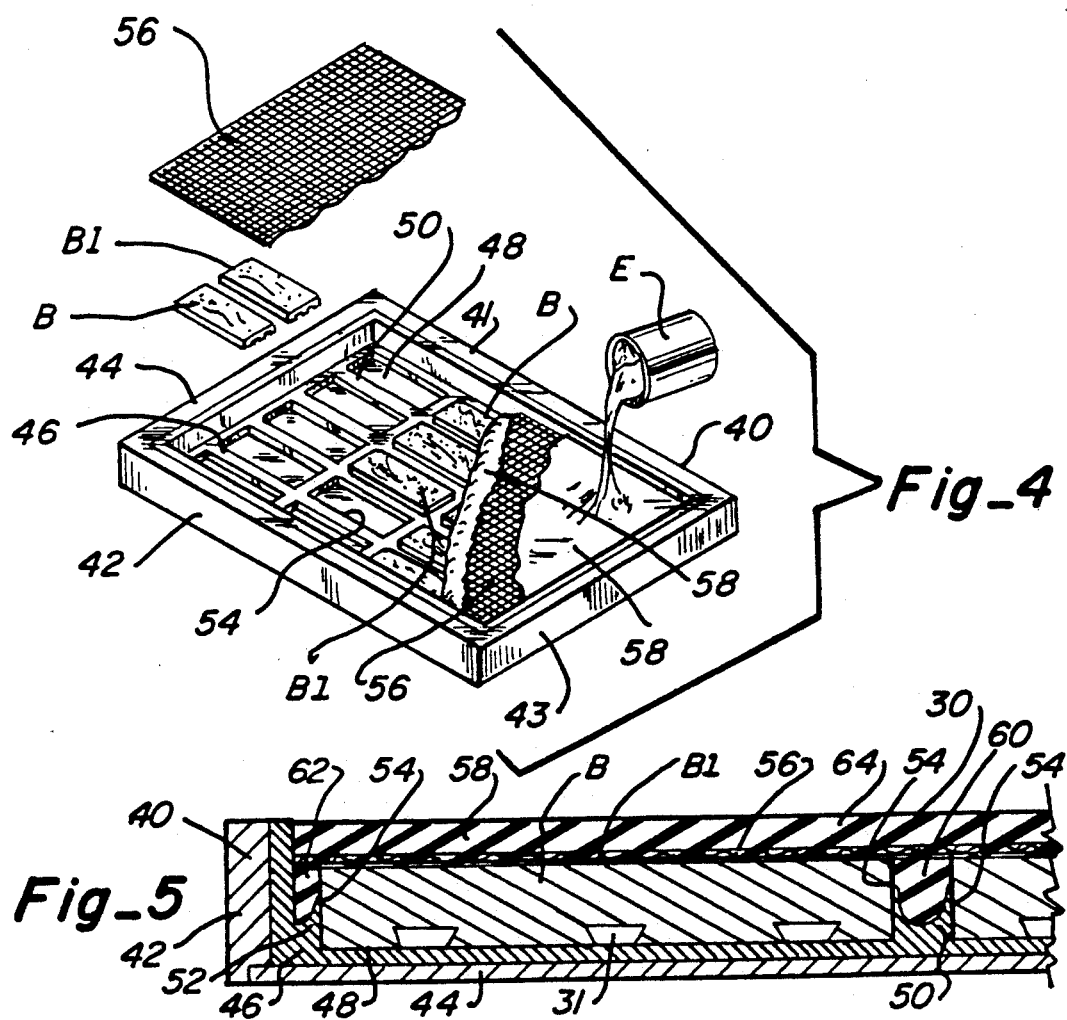
Fig_4
Fig_5

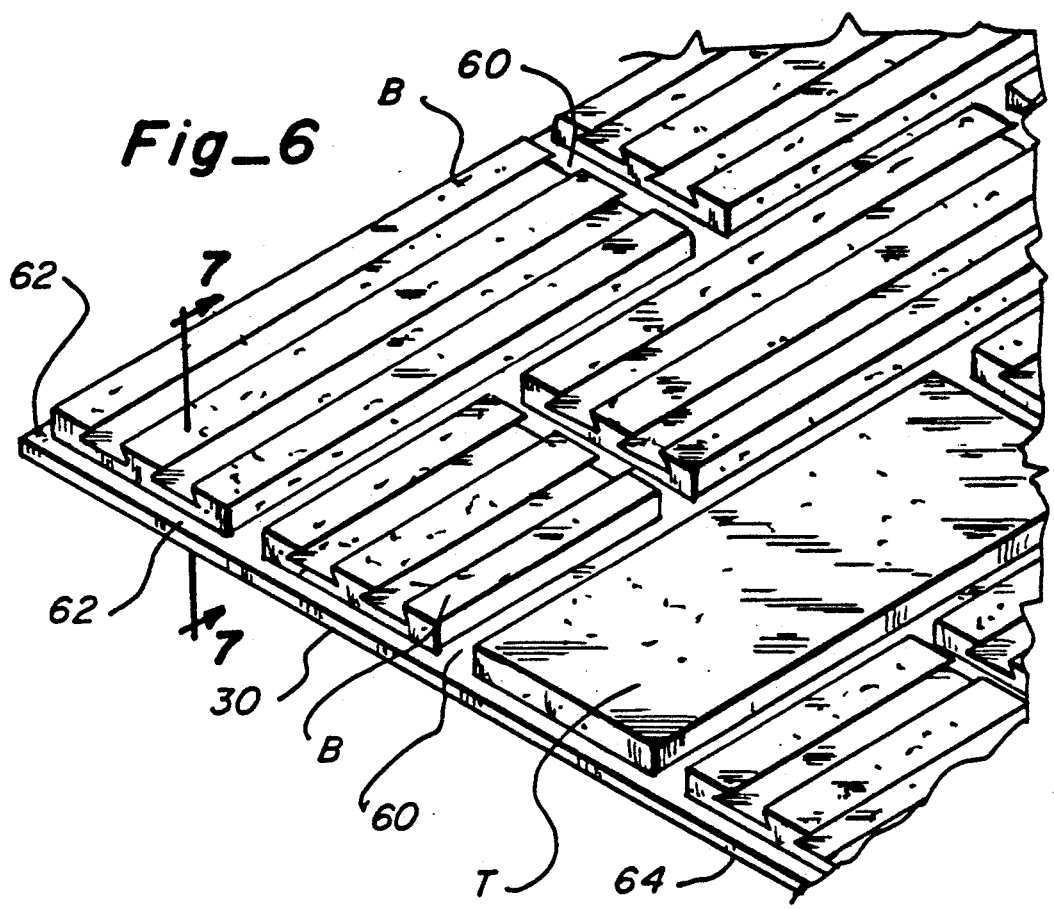
Fig_6
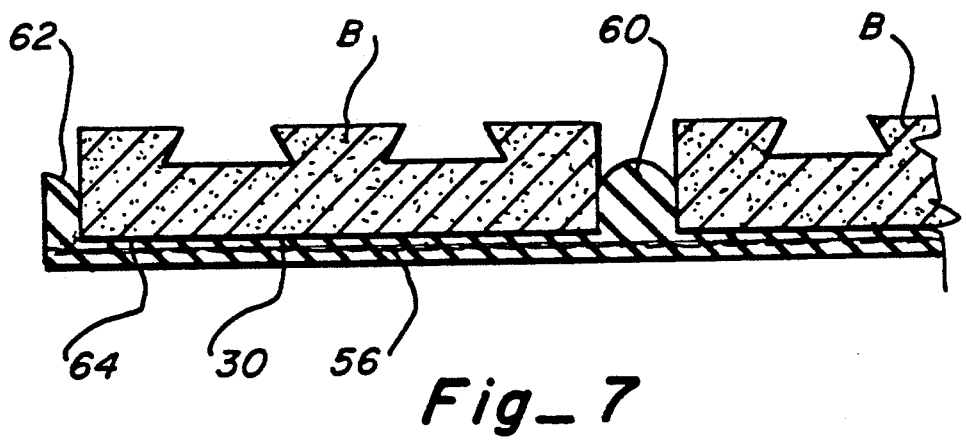
Fig_7

METHOD OF MAKING AN OBJECT RETENTION LINER FOR CONCRETE CONSTRUCTION

FIELD OF THE INVENTION

This invention is directed to a concrete form liner for releasably securing objects within a concrete form. It is more specifically directed to a concrete construction form liner which is capable of securely retaining objects and holding these objects during transportation and within the form during the pouring and setting of concrete and yet, capable of releasing the object leaving it in the surface of the concrete structure upon form removal.

BACKGROUND OF THE INVENTION

Over the years a number of problems have been encountered in the construction of concrete walls and panels. One of these problems relates to the fact that a bare concrete wall is aesthetically displeasing and for this reason a number of methods have been proposed to texture or provide a surface finish to the outer surface of the wall to provide an aesthetically and architecturally pleasing appearance.

As a result of the these proposals, a number of different arrangements have been tried to adhere or embed articles or texture in or on the surface of finished concrete structures with varying degrees of success. As is well known in the prior art, different methods have been attempted to hold bricks and other objects in a form, usually horizontal, while the concrete is poured over the objects so as to embed and hold the objects in the surface of the concrete panel. The panel is then used to form the wall, such as by attaching it to an existing structural surface or using that panel as the surface treatment in a new wall structure. While in many cases bricks have been used as the surface treatment, other objects can be used, such as tiles, stones, exposed aggregates, or the like which provide a visually pleasing result.

In addition to the embedding of objects such as bricks in concrete panels that are used in construction, various types of concrete form liners have been provided wherein the liner has a reverse texture or contour design provided in its surface. The liner is attached to the inside surface of the concrete form whereby the concrete which is poured into the form and set will take on the textured appearance of the liner. These treatments include such appearances as simulated brick or wood, rough corrugated surfaces, and vertically or horizontally grooved surfaces.

When dealing with objects to be embedded in the wall surface, one of the liners or devices which have been used in the past produce a reliable method which will allow consistent transfer of the objects into the finished surface during the construction phase. In many cases, objects such as bricks or tiles are adhered or physically attached to some kind of a form or panel and this form or panel is then used in conjunction with the concrete form to position the embedded object in the surface. In some cases, the object, especially if it is vertical construction, loosens in the liner or form and falls to the bottom of the form during the handling and installation or during the actual pouring of the concrete. Considerable stress and impact is imparted to the form and object when the concrete is poured into the form and when vibrators are used to move the concrete and fill the surfaces of the form. When objects are dislodged in the form, considerable labor and cost is incurred since the concrete has now filled the space that would have been occupied by the object and it is necessary to remove this concrete and manually reinstall an object to fill the missing space. This additional time and cost adds greatly to the expense of the project and in some cases will make the project uneconomical.

In order to eliminate these problems it is necessary to provide a retention liner product which will securely retain objects and allow these objects to be held in the concrete form without loosening. An additional aspect of this approach is the requirement that once the concrete has been poured and set it is necessary to easily release the object from the liner to reveal the clean, finished surface. These two requirements are in direct opposition to each other and this is why the present invention is so innovative and unique.

INFORMATION DISCLOSURE STATEMENT:

The following information is provided in compliance with the inventors' duty to disclose all pertinent information which is relevant to the examination of the subject application. The patents are known to the applicants and are believed to be pertinent. It is not to be assumed that this list is all inclusive of any search which may have been performed for or by the applicants. In addition, it is possible that other patents may have been considered by the applicants but those items are not believed to be pertinent and of concern with respect to the examination and patentability of this invention.

The Iragorri patent (U.S. Pat. No. 3,602,476) discloses an elastomeric template which is formed with recesses having surrounding ridges. The recesses form a pattern for retaining thin bricks to simulate brick construction in a conventional masonry wall. The ridges form the recess for the grout grooves between the bricks and also serve to hold and seal the bricks in place and to prevent mortar from contaminating the face of the brick during the concrete pouring process. The horizontal template provided by Iragorri is a one step device for holding the bricks in position to form a surface of a mold for forming a conventional concrete building panel. The template only positions the brick but does not allow the brick to be secured for shipping or use in a vertical concrete form. This is contrary to the present invention which is a two step retainer which allows the brick to be formed with the liner and handled, shipped and used in a vertical masonry concrete wall structure with later positive release.

The Condor, et al patent (U.S. Pat. No. 3,231,646) shows a mechanical retainer for holding bricks in a concrete form during the pouring of a vertical masonry wall structure. A plurality of spring biased hooks are inserted through the form to hold the bricks in proper position during the pouring process. Again this is a one-step retainer for construction.

The C.A. Hardie, et al patent (U.S. Pat. No. 2,465,871) shows the structure of a concrete form which has a series of ridges formed on the surface of the form for holding simulated bricks in proper position. The bricks which are used with this arrangement are formed with a finished face and are provided with a longitudinally extending tongue on the backside. Once the bricks have been positioned in the horizontal form a reinforcing grid is placed over the exposed tongues to hold the bricks in proper position in contact with the form. The form is then raised into vertical position with respect to the opposite form and the concrete wall is then poured. Once the concrete has set, the form with the recessed facing is then removed. The buildup, including the placement of the bricks and the attachment of the reinforcing grid, is all done at the job site in a one-step horizontal operation.

The Maynard patent (U.S. Pat. No. 3,349,158) is a method and apparatus for making building panels having mosaic tiles embedded in a surface of a panel. In this arrangement the tiles are placed in a shallow frame and properly positioned in a spaced relation. An adhesive carrying sheet is positioned over the face of the tiles so that the sheet is secured to the tiles. The tiles are then transferred to a mold by lifting and moving the sheet and properly positioning it in the mold with the back surface of the tiles exposed. A liquid binder is then poured over the tiles in order to embed and hold the tiles in position in the panel. The adhesive carrying sheet in this arrangement is used for holding the tiles in position and allowing the tiles to be moved as a unit and molded in a layer operation. This is the only patent which has been found which has a two-step retention and transferring function which is similar to that which is provided in the present invention. The applicant's invention, however, is decidedly different in that the retention device is a pliable form liner which retains and seals the objects without the use of any adhesive or interface preparation and which gaskets and protects the face of the objects.

The Porter, et al patent (U.S. Pat. No. 4,662,140) and the Bauer, et al patent (U.S. 4,809,470) disclose a brick panel system for use in construction. Both of these arrangements reveal a base panel which has arrangements for permanently holding brick facing blocks in proper position on the front of the panel. There is no intent to transfer or use these panels in the pouring of a concrete wall structure. These panels are the actual structure and hold the brick in position to form the face of the wall.

The Trezza patent (U.S. Pat. No. 4,773,201) discloses a formed sheet, which can be metal, which is provided with parallel channels which are arranged to receive a plurality of bricks in conventional staggered position. The bricks are held in position by double sided tape with a sheet having holes to expose the opposite side of the tape. The sheets are then attached to the building structure by the opposite surface of the tape. The sheets can also be attached to the building structure by nails or other suitable means. In this way, a brick wall surface is formed by the use of a plurality of the sheets arranged in interlocking fashion.

The Renkert patent (U.S. Pat. No. 4,031,682) discloses another way of forming a brick building panel. A thin plastic sheet having a plurality of properly positioned recesses is formed. This sheet is used as a panel mold with the bricks laid and positioned on the horizontal sheet and then a cementatious mixture is then poured over the exposed surfaces of the bricks. A lattice work or metal grid is positioned over the back surface of the mixture and a mixture of cement and fibers is then applied over the lattice work so as to bond the lattice work to the mixture. In order to finish the panel, insulation materials may be applied to the back surface of the mixture and lattice and a finished surface can be applied to the insulation. In this way, a building panel having a brick surface finish can be formed. The panel is merely removed from the mold sheet allowing the mold sheet to be reused in the next forming process.

The Kasten patent (U.S. Pat. No. 4,239,824) shows a means of encasing objects to allow them to be handled and positioned as desired. In this arrangement a transparent plastic sheet is heated to a softening temperature and the objects, such as crushed stone, marble chips or the like are impressed in the surface of the sheet so that they are substantially surrounded and retained. This sheet can be used in covering the ground to provide a pleasing natural landscaped appearance. This sheet retains the particles on a permanent basis and there is no intent to transfer the particles to the surface of a concrete structure as provided in the present invention.

The Hoyt et al patent (U.S. Pat. No. 4,026,083) and the Goldman patent (U.S. Pat. No. 4,858,410) show a sheet like modular tray to aid in the laying of bricks for a driveway or patio. The tray is formed with a plurality of recesses for properly positioning bricks which are inserted into the tray after it has been horizontally positioned. The bricks remain in the tray and the tray remains permanently in the structure. The bricks as they are held in position in the trays have the spaces therebetween filled with grout or sand. There is no intent to retain or transfer the bricks through the use of the modular trays and the trays are intended to remain as a permanent part of the structure.

SUMMARY OF THE INVENTION

The applicants' invention is directed to a two-step object retention device which doubles as a liner for use for surfacing concrete wall structures. This invention covers the apparatus and method of making the liner to greatly improve the efficiency of constructing the concrete structure.

Up to now, most of the arrangements which have been utilized are of the single step type which means that the retainer is used to hold the objects, such as bricks, strictly during the forming and pouring of the cementatious mixture in a horizontal position to form a plurality of building panels or as part of the vertical form when directly forming and pouring a wall or concrete structure.

The present arrangement is devised to handle any objects or a mixture of objects which are desired to be firmly embedded in the surface of the concrete structure to provide an aesthetically pleasing appearance. These objects can be bricks, stone, pebbles, tiles, crushed rock or any other material which is desired and the liner can be used in either a horizontal or vertical position.

To make the liner, a flat shallow tray is fabricated which in turn is positioned on a horizontal supporting surface. A template having individual pockets or recesses to properly fit and position the objects can also be inserted in the tray. For the sake of illustration during the course of this application, reference will be made directly to the use of thin bricks for retention in the liner. It is to be understood, however, that as explained above any object can be used as desired with this invention.

With the use of thin bricks the tray and/or template is normally formed with a plurality of recesses in a type of conventional brick pattern, such as either the staggered or stacked pattern. The individual recesses formed in the tray or template are relatively shallow and ridges forming the grout line and spacing for the bricks are provided between each recess. Although it is not mandatory, it is possible to provide an outwardly extending lip along the edges of each of the ridges so that when a brick is positioned within the recess the lip will form a seal around the brick and prevent the liner material from flowing into the recess and contacting the back surface of the brick. This seal can also shape the grout edge contour.

Once the bricks have been placed in position within the tray a suitable liquid elastomer polymeric or rubber material is then mixed and poured over the front surfaces of the bricks to completely fill the tray and the spaces between the individual bricks. The depth of the material can be very shallow and is designed to cover the face of the brick by approximately 1-4 mm. During the pouring process a fiberglass or plastic mesh or screen type material can be embedded in the elastomer to provide additional reinforcing and to prevent the elastomeric material from tearing or stretching during use. In this way, a very thin form liner is provided which has an overall thickness of approximately 1-4 mm in the areas of the surface of the brick and approximately a 6-10 mm in the areas between the bricks. It is to be understood that although the preferred embodiment of the invention has a thickness range of 1-4 mm, the thickness of the liner can be any dimension especially if a specific use or unusual requirement is being addressed.

One of the most critical features of this invention is the discovery that the elastomer without any mechanical retention device or adhesive will tenaciously bond with the brick by adhering to the surface and filling all of the pours, openings and defects found in the surface of the brick. In fact, this bond is so good that once the elastomeric material has properly set the liner can be easily removed from the tray along with the objects which are securely retained in the surface of the liner material. The liner along with the retained bricks can be easily handled, stored and shipped to the desired building site for use. In this way, the liner can be produced in mass quantities at a manufacturing facility producing considerable savings in the overall cost of construction.

Once the liner has been received at the building site it can be easily positioned and fastened to the inside surface of the concrete form and held in proper position. Upon completion of the form structure the concrete can be poured into the form and vibrated without dislodging or disturbing the retained bricks. After the concrete has properly set the outer form structure can be removed with the liner retained over the finished surface. In this way, the surface of the concrete structure can be protected during the interim while the contractor is finishing and completing the concrete structure. After most of the work has been completed the elastomeric liner can then be peeled easily from the surface of the embedded bricks exposing a protected and clean surface. In this way, a minimum of cleaning and repair to the finished surface of the structure is required. This can result in a considerable savings in time and cost to the contractor and produce a considerably improved finished surface.

One of the major problems that is encountered in using a transfer method for holding bricks or other objects in a liner while concrete is being poured is that the wet concrete will easily seep into the recess formed in the liner if a gasketing arrangement is not provided. Thus, it is extremely important to provide a close fitting gasketing feature to the liner so that the face and edges of the object are sealed to prevent the concrete from contaminating the surface of the embedded object. The present invention does exactly that. As the object is embedded in the liner during the molding process, it covers the outer or face surface of the brick and extends down along the sides of each brick. At the same time, the elastomeric material closely adheres to the surface of the brick filling every void and pore that is present. The fingerprint of the brick is permanently formed in the surface of the elastomeric material. In this way, the material forms a tight sealing gasket protecting the outer surface of the object. The concrete is prevented from penetrating the sides and face of the brick greatly improving the procedures for making a concrete structure.

Throughout this application reference has been made to elastomeric polymeric materials which are used to mold and fabricate the object retention liner. The elastomeric material which is intended for this purpose must be a soft, flexible, resilient, synthetic polymeric material and may include a group including silicon resins as well as polyurethane resins. To provide a close bond to the object and yet allow the liner to be releasably removed when desired, the liner must be flexible enough to be pulled from the surface of the object and release from the cavities and pores without breaking the brick or concrete or without tearing the liner itself.

Other features and advantages of the present invention will become apparent from the following detailed description of the invention when it is considered in conjunction with the accompanying drawings.

BRIEF DESCRIPTION OF THE DRAWINGS

FIG. 1 shows an isometric cutaway view showing the object retention form liner applied to the inside surface of a concrete form for pouring a vertical wall structure;

FIG. 2 is a cross-sectional view taken along the lines 2—2 of FIG. 1 showing the retained bricks embedded in the surface of the concrete wall structure;

FIG. 3 is a pictorial view showing the object retention liner being stripped from the surface of the finished wall;

FIG. 4 is an exploded isometric view showing the method of making the object retention liner according to the present invention;

FIG. 5 is a cross-sectional view of the form shown in FIG. 4 wherein the elastomeric material has been poured to encapsulate the outer surface of the objects;

FIG. 6 is an isometric view of a portion of the form liner according to the present invention; and FIG. 7 is a partial isometric view taken along lines 7—7 of FIG. 6 showing the convex grout seal formed between the objects.

DETAILED DESCRIPTION OF THE INVENTION:

Turning now more specifically to the drawings, FIGS. 1-3 show the construction of a vertical concrete wall produced with a simulated brick facing on one side.

The form 10 which is used to contain the concrete (C) while it is setting includes side forms 12, 14, horizontal walers 16 and vertical ribs 18. Cross ties 20 are used to hold the vertical side forms 12, 14 at a precise spacing distance to maintain a constant thickness in the finished wall structure.

The object retention form liner 30 according to the present invention is suitably secured to the inside surface of the vertical wall form 12. The liner 30 is attached to the surface of the vertical form 12 usually by nailing the liner with finishing nails through the ridge portion of the liner between the thin bricks. Although other fastening arrangements such as adhesive, staples, tape, etc. are feasible the use of finishing nails is preferred since these nails will pull through the liner when the vertical form 12 is removed from the structure. In this way, the liner will remain with the set concrete to protect the outer surfaces of the bricks. Of course it is also understood that the object retainer form liner 30 can be applied to the inside surface of both of the vertical forms 12, 14, if it is desired to have objects embedded in both sides of the wall.

As can be seen in FIG. 2, the poured concrete (C) fills the spaces 32 along the sides of the brick and the undercut cavity slots 31 provided in the rear surface of the brick. In this way the concrete permanently retains and holds the bricks in the surface. This space 32 formed between the bricks simulates the grout line in conventional masonry construction. As will be explained later the liner can provide a convex configuration in this space which leaves a concave impression in the simulated grout line provided between the bricks.

Once the concrete (C) has properly set, the form structure including walers 16, vertical ribs 18, and vertical forms 12, 14 are removed from the wall. In this way the surface of the concrete on one side is exposed while on the opposite side the outer surface of the form liner 30 is exposed. In most cases the form liner 30 will be left intentionally on the surface of the wall or concrete structure in order to protect the outer surface of the bricks (B) that are permanently embedded in the surface. In this way the outer surface will be protected while the remaining construction work is completed. Once the construction work has been finalized the liner 30 can then be removed from the outer surface of the finished concrete wall as illustrated in FIG. 3. By pulling at one corner of the liner, the liner can be peeled or pulled from the surface of the bricks exposing their outer surface. Because of the excellent gasketing effect that is produced by the liner according to the present invention, it is believed that further time and effort which is normally required to clean and remove the concrete that has migrated to the outer surface of the bricks or objects can be completely eliminated. Thus, the completed and finished wall is exposed when the liner is removed.

FIGS. 4-5 illustrate the process which is used to fabricate the object retention form liner according to the present invention. In this process a shallow tray or mold 40 is provided which has side members 41, 42, 43, 45 and a flat bottom support 44. A molded template 46 is positioned within the tray 40. The molded template 46 has recesses 48 sized to closely fit the anticipated objects, such as bricks (B), and ridges 50 properly spaced between the recesses 48. The ridges 50 have the normal width which is required for simulating a grout line provided in the finished wall structure. A half ridge 52 is formed along the outside edge of the template 46 whereby when the liner is positioned adjacent to the next liner the two half ridges will form a conventional full ridge to maintain the proper spacing between the bricks. The inner edges 54 of the ridges 50, 52 have a thin tapered edge which is molded to extend outwardly into the recesses a short distance. In this way, when the bricks are inserted into the recesses 48 the ridges 50, 52 are forced back by a hand tool or other suitable device to accept the bricks giving the outer surface of the ridge a concave effect which also seals the ridge against the sides of the brick. As can be seen this configuration simulates the actual finished shape of the concrete between the embedded bricks and thus forms the conventional grout appearance. Also as noted in FIG. 5, the brick (B) is placed in the tray 40 with the face or outer surface (B1) exposed in the upward facing position.

After all of the bricks are properly installed a pourable mixture of a suitable elastomeric material is poured into the tray 40 to completely cover the face surface (B1) of the bricks (B). At this point a mesh material which is classified as a "tensional" member is laid over the interim surface of the elastomeric material 58. The mesh tensional member is sized to extend the full width and length of the interior of the mold or it can be positioned slightly short of the outer perimeter of the mold area so that the edges of the mesh will not be exposed in the edges of the liner. Fiberglass woven cloth having a 20 mesh has been found to be quite satisfactory since there is minimal elongation in the material which is required for stabilizing the liner. The fiberglass woven material 56 adheres and is permanently embedded in the elastomeric material 58. In this way, the finished liner 30 has considerable tensile strength and prevents the liner from being distorted during handling and installation. This is found to be very helpful to maintain the natural adhesion of the elastomeric material and retain the bricks. The combination of the tenacious adherence of the elastomeric material to the bricks as well as the lack of distortion of the liner provided by the tensional member produce unique and unobvious results which have never heretofore been accomplished.

After the mesh material 56 has been placed on the interim surface of the elastomeric material 58 additional elastomeric material is poured into the mold to bring the total thickness of the main body of the liner 64 to the desired dimension. It has been found that a thickness of approximately 1-4 mm (1/16"-3/16") has been found to be adequate. Although the thickness of the backing portion 64 of the liner 30 is described as being quite thin it is also understood that any increased thickness can be used, if required. One of the main reasons for keeping the back portion of the liner as thin as possible is to minimize the weight of the liner weight and the volume within the form that is taken up by the liner. The other consideration when referring to the overall thickness of the liner is the height of the ridges between the bricks (B) in the finished liner. As seen in FIG. 7, the main ridge 60 and half ridge 62 are contoured in a convex configuration to simulate the finished grout line between the bricks and the finished wall structure and the depth of the grout line adds to this simulation. Usually the ridge has a height of approximately one-half of the thickness of the thin brick or a reasonable height on a full sized brick.

The liner 30 can be formed by molding and curing liquid polyurethane or silicone elastomers, or other suitable elastomers from synthetic polymers. The polyurethanes are generally polyfunctional long chain alcohols with a plurality of hydroxyl groups reacted with a polyiscocyanate. The polyurethanes themselves are esters of dicarbamic acids and glycols or inter-molecular esters of gama-hydroxic carbamic acids. The polyurethane elastomers are made from diisocyanates, aliphatic polyesters, etc. Several types of polyurethanes are commercially available as two-part pourable liquids, which have a good shelf life and are easily mixed with the necessary polymerizing or curing agent. One form is a polyester made from ethylene and propylene glycols with adipic acid. A curing agent such as toluene, naplathene or diphenylmethane diisocyanates may be used. The resultant polymeric material should have the hardness, tensile modulus, elongation, tear strength, tensile strength and abrasion resistance which is common for materials used as liners for concrete forms. One of the specific liners manufactured by the applicant is a polyurethane elastomer called "Flexliner" having a Shore A hardness of 53-56, a tensile modulus of 212-234 psi, elongation of 270-300%, tear strength of 67-73 psi, and a tensile strength of 504-563 psi.

Properly mixed, the two-part elastomeric material 58 which can be used in the present process will cure to sufficient hardness in approximately thirty minutes depending upon the temperature and the environment. As is generally known this time can be reduced somewhat by providing additional heat externally to the mold 40. Usually the thirty minute time period for setting of the elastomeric material is quite sufficient to allow the embedding of the tension member and the completion of the process without problems.

Throughout this application reference has been made to the fact that the elastomeric material described and used herein provides a tenacious adherence to the objects that are to be retained. As part of this adherence, the outer surface or face of the object is sealed by the gasketing effect which is obtained by using the elastomeric material. A decided benefit and advantage is provided by this effect which substantially eliminates the extra cost and manpower required to clean and finish the final surface. In addition, the elastomeric material in combination with the fiberglass reinforcing mesh provides a tensional member which greatly eliminates the distortion which is common in form liners of this type and eliminates the loosening of the objects due to distortion which has been encountered in the prior art. The combination of these factors has proven to be of substantial benefit to contractors.

While a process and apparatus for an object retention form liner has been shown and described in detail in this application, it is to be understood that this invention is not to be limited to the exact process and form disclosed and changes in the detail and construction may be made without departing from the spirit thereof.

What is claimed is:

1. A method of making an object retention form liner for use in embedding objects having a face surface which is to be exposed in the finished surface of a concrete structure, the method including the steps of:
   a) positioning a shallow tray on a horizontal support surface, the inside dimensions of said tray corresponding to the finished outside dimensions of said form liner;
   b) placing objects in said tray in a spaced array which is desired for the finished surface of the concrete structure, said objects being positioned in a face upward configuration in said tray;
   c) pouring a liquid elastomeric material into said tray to a depth which covers said objects;
   d) curing said elastomeric material to form a form liner containing said objects; and
   e) removing said form liner from said tray with said objects firmly retained in said liner for use in construction of a concrete structure.

2. A method of making an object retention form liner as described in claim 1 which further includes a step of embedding a tensional member in the elastomeric material while it is still in a liquid state to stabilize the liner and aid the retention of said objects.

3. A method of making an object retention form liner as described in claim 2 wherein said tensional member is a woven mesh material that is submerged in the surface of said elastomeric material.

4. A method of making an object retention form liner as described in claim 1 which further includes a step of positioning a template in said tray prior to placing said objects, said template having a plurality of recesses sized to closely fit said objects and ridges formed between each of said recesses, said ridges being formed to produce a seal in the poured elastomeric material between said objects so as to provide a gasket effect around each object to prevent concrete from migrating to the face surface of said objects.

5. A method of making an object retention form liner as described in claim 1 wherein the elastomeric material is a pourable polyurethane elastomer.

6. A method of making an object retention form liner as described in claim 1 wherein the elastomeric material fills the tray to a depth within the range of 1-4 mm above the objects.

7. A method of making an object retention form liner as described in claim 4 wherein the ridges of the template are formed to produce a convex lip along the space in the liner between the objects to produce a concave grout line between the objects embedded in the finished surface of the concrete structure.

8. A method of making an object retention form liner as described in claim 1 wherein the placed objects are thin bricks having one or more undercut grooves on the surface opposite the face surface of the brick.

* * * * *